United States Patent
Casagrande et al.

(10) Patent No.: US 6,381,709 B1
(45) Date of Patent: *Apr. 30, 2002

(54) PROCESS AND APPARATUS FOR DOWNLOADING DATA FROM A SERVER COMPUTER TO A CLIENT COMPUTER

(75) Inventors: Steve M. Casagrande, Boston; Edward Ioffe, Roslindale, both of MA (US)

(73) Assignee: Steven M. Casagrande, Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/541,184

(22) Filed: Apr. 3, 2000

Related U.S. Application Data (63) Continuation of application No. 08/804,902, filed on Feb. 24, 1997, now Pat. No. 6,049,892.

(51) Int. Cl.[7] ............................................... G06F 11/14
(52) U.S. Cl. ..................................... 714/18; 714/748
(58) Field of Search .................... 714/18, 748, 749; 709/203, 231, 236, 238; 707/202

(56) References Cited

U.S. PATENT DOCUMENTS

| 4,712,214 | A |   | 12/1987 | Meltzer ........................ 371/32 |
| 5,267,235 | A |   | 11/1993 | Thacker ....................... 370/60 |
| 5,396,613 | A |   | 3/1995  | Hollaar ........................ 395/575 |
| 5,495,610 | A |   | 2/1996  | Shing .......................... 395/600 |
| 5,553,083 | A |   | 9/1996  | Miller ........................... 371/32 |
| 5,583,563 | A |   | 12/1996 | Wanderscheid ............. 348/13 |
| 5,721,824 | A |   | 2/1998  | Taylor .................... 395/200.33 |
| 5,949,419 | A | * | 9/1999  | Domine et al. ............. 345/349 |
| 6,049,892 | A | * | 4/2000  | Casagrande et al. .......... 714/18 |
| 6,098,180 | A | * | 8/2000  | Kobata et al. ................. 714/18 |
| 6,049,671 | A1| * | 4/2001  | Slivka et al. ............... 395/712 |

OTHER PUBLICATIONS

Microsoft Press Computer Dictionary, 3rd ed., p. 505, 1997.*
J. Postel, J. Reynolds, File Transfer Protocol, Oct. 1985, 62 pgs.
R. Fielding, Hypertext Transfer Protocol, Jan. 1997, 142 pgs.
FTP Explorer, Oct. 1996, 15 pgs.
FTP (File Transfer Protocol), Internet Request For Comments (RFC) 959 (Oct. 1985).
Letter from Arthur S. Rose of Knobbe, Martens, Olson & Bear dated Oct. 17, 2000.
HTTP 1.1 (HyperText Transfer Protocol), Network Working Group Request for Comments: 2068 (1997).
FTP Explorer Documents, including Transfer Manager, Tool bar Oppions, Connections Dialog, and How to Create a Server Profile.

* cited by examiner

*Primary Examiner*—Scott Baderman
(74) *Attorney, Agent, or Firm*—Edwin H. Paul (57) ABSTRACT

A download of a data file from a server computer to a client computer is monitored by the client computer. The download is restarted automatically if a failure occurs. A failure may be a timeout, a loss of a connection, data errors, or other errors that terminate the download. The download may be restarted by instructing the server computer to start reading from a specified offset corresponding to an amount of data that was received reliably by the client, so that data is not unnecessarily retransmitted. This process increases the likelihood that a download will complete successfully. The client program, if specialized for performing downloads, may be stored at the server. In response to a request to download a file, the client program is downloaded first, with the location of the requested file stored within the program. The client program is then executed on the client computer to transfer the requested file. The client program can be made sufficiently small so that downloading of the client program takes little time. The client program can be executed immediately, at a time specified by the user or upon command from the user.

5 Claims, 6 Drawing Sheets

PROCESS AND APPARATUS FOR DOWNLOADING DATA FROM A SERVER COMPUTER TO A CLIENT COMPUTER

RELATED APPLICATIONS

This application is a continuation of allowed U.S. patent application Ser. No. 08/804,902, filed Feb. 24, 1997 now U.S. Pat. No. 6,049,892, of common and inventorship. Priority is claimed from this prior application.

FIELD OF THE INVENTION

The present invention is related to processes and apparatus for transferring information between computers, particularly between a client computer and a server computer where the information is stored.

BACKGROUND OF THE INVENTION

In most computer networks it is desirable to have the capability to download, i.e., transfer, data from one computer to another. Typically, data is downloaded from one computer on the network, such as an information provider's site on the Internet, to another site, i.e., computer, where the data is to be used. A file containing data, such as an executable program, graphics or other information, typically is made available for download at one or more sites. The availability of the file is advertised to potential users. Individuals who are interested in using the file access the site to download the file. This kind of information distribution reduces costs and enables efficient tracking of the use of the information.

There are several applications that provide a protocol for downloading files from a server computer to a client computer on a network. Example applications which use the Internet or other TCP/IP-based network include servers and clients that implement the hypertext transfer protocol (HTTP) and the file transfer protocol (FTP). A particular problem with downloading information using applications that support these protocols is that the server application relies solely on the underlying transport protocol for reliability in the delivery of the data. If an error occurs during transmission of the data, the download simply terminates. For the download to complete successfully, the operation must be manually tried again, and the entire file must be downloaded. Such a process can be time consuming and frustrating, especially if the download is almost complete when a failure occurs.

However, the FTP specification, defined in Internet Request For Comments (RFC) 959, includes a restart procedure by which an interrupted FTP service command can be restarted from the point where it was interrupted. This restart procedure is defined for only two of the three modes in which data transfer can occur: block mode and compressed mode. In block mode, data is transmitted as a series of data blocks preceded by one or more header bytes. One of these header bytes includes descriptor codes, which may indicate a restart marker. In compressed mode, transmitted data includes regular data, compressed data and an escape sequence of two bytes. The escape sequence also includes descriptor codes that have the same meaning as in block mode.

To support restart in FTP, the sender of data must send data in block mode or compressed mode and insert a restart marker, or marker code, in the data stream with some marker information. The marker information has,meaning only to the sender, and could represent a bit-count, a record-count, or any other information by which a system may identify a data checkpoint. The receiver of data, if it implements the restart procedure, then marks the corresponding position of this marker in the receiving system. In the event of a failure, the user sends a command called RESTART, with a marker code as its argument. The sender then skips over the file specified by the marker code to the data checkpoint specified by the marker code. The RESTART command must be immediately followed by whatever service command was interrupted, such as a read (RETR), write (STOR), directory (LIST) or append (APP). This restart procedure requires both the server to maintain a mapping between data checkpoints and marker codes for each operation and the client to monitor the marker codes received. Moreover, these commands are initiated manually by a user using the FTP client application.

Most currently available server and client programs that support FTP do not support block or compressed mode transfers, and generally support only a third mode of transfer, called stream mode. Most browsers for the Internet also use only this mode of transfer for communication using HTTP. In stream mode data is transmitted as a stream of bytes, without restriction on the representation type used. If the structure of the data is a file structure, an end-of-file (EOF) indication is indicated by the sending host closing the data connection and all bytes are data bytes. The FTP specification does not define any restart procedure for stream model transfers. Accordingly, most currently available server and client programs that support FTP also do not support the RESTART command. If a failure occurs during a download, the operation must be manually tried again, and the entire file must be downloaded, obliging an individual to be present during the download.

Similarly, browsers using the HTTP protocol do not support any restart procedure. A proposed specification for a new version (1.1) of HTTP includes a range header in a GET message to enable partial transfers and is intended to reduce unnecessary network usage. See Internet Request for Comments (RFC) 2068. However, the use of a partial GET command by the client is not specified. The HTTP 1.1 specification as proposed also states that a client should retry a request if a connection closes before any status, or a continue response, is received from the server. However, there is no specification regarding error handling if data is received from the server before a connection closes. Apparently, if a failure occurs during a download, the operation must be manually tried again, and the entire file must be downloaded, obliging an individual to be present during the download.

Accordingly, a general aim of this invention is to provide a download process and mechanism that simplifies the download process, and improves the likelihood of successful completion of the download. This functionality also allows the individual not to be present during the download.

SUMMARY OF THE INVENTION

In the present invention, a download is monitored by a client application and is restarted automatically if a failure occurs. Data read during the restarted download is appended to the existing file. Termination of a download might occur due to a failure of the server system or failure of the network or for many other reasons. These failures can be detected, for example, by monitoring whether valid data has been reliably received at the client within a specified period of time. Automatically restarting the download after such failures increases the likelihood of successful completion.

In a particular embodiment, the server application can transfer the data to the client as a stream of data with little or no formatting or processing, for example by using the stream mode in FTP. In this embodiment, the client monitors the amount of data reliably received. In case of a failure, the client automatically sends another request to the server, instructing the server to start reading the file from a specified offset, determined by the amount of data already received. In this embodiment, there is no need for marker codes or other processing to be performed and tracked by the server.

In another embodiment, the client program is specially adapted for performing only read or retrieve requests which reduces the size of its program code. In response to a request to download a file, the client program is downloaded first from the server computer. The location of the requested file may be stored, or hard-coded, within the program. The client program is then executed on the client computer to transfer the requested file.

In another embodiment, the client program is used to download files that are made available through other services, such as by a listing in a document published in the hypertext markup language (HTML) via an HTTP server connected to a network. An HTML browser that accesses and displays the HTML file can display the files available for download as hypertext links. Selection of a hypertext link viewed in the browser causes the client program to be executed to download the requested file. In this embodiment, the client program may be resident at the client computer as a separate program, may be part of the browser or can be downloaded from the server before execution.

In these embodiments, the client program can be executed in response to some action by another program, at a time specified by the user or upon command from the user. By allowing a user to specify a time for a download operation in combination with the ability to automatically restart a download, the user may be absent, yet have an increased likelihood that the download will be successful. The various embodiments can also be used in combination with each other.

Accordingly, one aspect of the present invention is a process or client system for downloading a data file from a server computer to a client computer, wherein the data file is stored on a computer readable medium connected to the server computer. The process and client system have an application protocol for sending data as a stream of data using a transport protocol over a computer network connecting the client computer to the server computer. The client computer initiates a download of the data file by sending, using the application protocol, a request for the data file to the server computer over the computer network. Data received from the server computer as a stream of data in response to the request for the data file is monitored to detect termination of the download of the data file and to track an amount of data from the data file successfully received by the client. The amount of data successfully received by the client is stored when an error is detected that terminates the download. In response to a detected error that terminates the download of the data file, the download of the data file is automatically restarted by initiating a second download of the data file by sending, using the application protocol, a request for the data file to the server computer, wherein the request specifies the amount of data successfully received.

In one embodiment, the download is initiated by sending a message to the server computer using a second application protocol requesting an indication of a port for a server process for performing the download. When indicator of the port is received, a message is sent to the server process using the application protocol at the indicated port to request the data file.

In another embodiment, the download is initiated by receiving from a user a specified time for performing the download of the data file. The message is sent to the server computer at the specified time.

Another aspect of the invention is a process and client system for downloading a data file from a server computer to a client computer, wherein the data file is stored on a computer readable medium connected to the server computer, wherein the process sends data over a computer network connecting the client computer to the server computer. The client sends a request for a client program to the server computer over the computer network. The client program is receiving from the server computer, in response the request. The client program when executed initiates a download of the data file by sending a request for the data file to the server computer over the computer network. The data received from the server computer in response to the request for the data file is monitored to detect termination of the download of the data file. In response to a detected error that terminates the download of the data file, the download of the data file is automatically restarted by sending a request for the data file to the server computer.

In one embodiment, the download is monitored by tracking an amount of data from the data file successfully received by the client. The amount of data successfully received is stored when an error is detected that terminates the download. In this embodiment, the download of the data file may be automatically restarted by initiating a second download of the data file by sending a request for the data file to the server computer, wherein the request specifies the amount of data successfully received. This embodiment may be particularly useful where the application protocol sends data as a stream of data.

In another embodiment, the download is initiated by sending a message to the server computer requesting an indication of a port for a server process for performing the download. After the indicator of the port is received by the client a message is sent to the server process at the indicated port requesting the data file.

In another embodiment, the client program, when executed, receives from a user a specified time for performing the download of the data file. The message is sent to the server computer at the specified time.

Another aspect of the present invention is a process or server system for downloading a data file from a server computer to a client computer, wherein the data file is stored on a computer readable medium connected to the server computer. The process uses an application protocol for sending data as a stream of data using a transport protocol over a computer network connecting the client computer to the server computer. A request is received for the data file from the client computer over the computer network, using the application protocol. Data is readfrom the data file and sent as a stream of data to the client computer using the application protocol. If the transfer terminates, after such a termination a request for the data file is received from the client computer, wherein the request specifies the amount of data successfully received. The data is read from the data file starting from an offset determined according to the specified amount of data and is sent as a stream of data to the client computer using the application protocol.

Other aspects of the invention include a computer readable medium on which executable program logic is stored, which when executed implements the client system or the server system described above. Another aspect of the invention is a combination of the client system and the server system. Yet another aspect of the invention is the combined process performed by the combination of the client system and the server system.

In all aspects of the invention, the transport protocol may be TCP or other protocol. The network protocol may be, for example, the Internet protocol (IP), allowing the invention to be used on the Internet or a private network. The computer network may be an ethernet, an asynchronous transfer mode network, or any other kind of network.

By using a client that monitors a download and automatically restarting the download from the offset at which a failure occurs, the user does not need to be present to make sure a download is successful. By using a server which starts reading and sending data from a data file from a specified offset within the data file, an interrupted download may be restarted where it left off. The combination of this client and server system increase the likelihood of success of the download and eliminate unnecessary data transfer.

DETAILED DESCRIPTION

The present invention will be more completely understood through the following detailed description which should be read in conjunction with the attached drawing in which similar reference numbers indicate similar structures.

Figure 1:
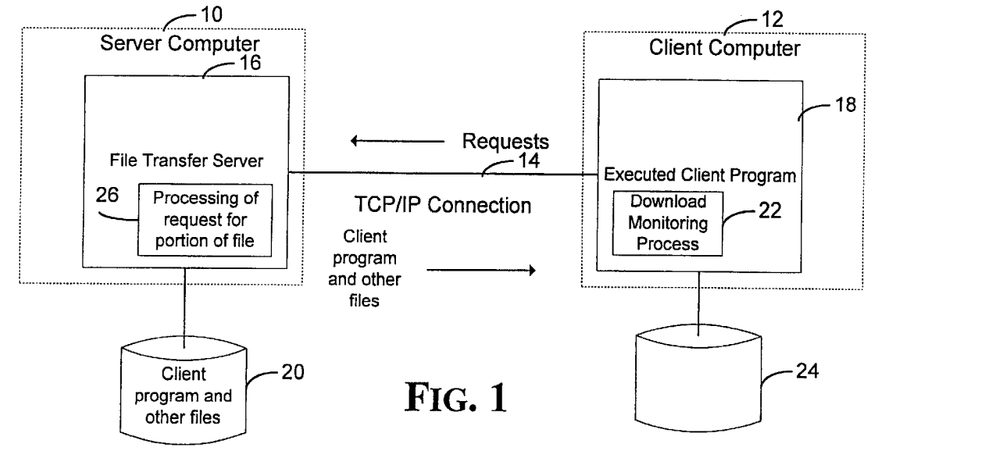
FIG. 1 is a block diagram illustrating a server computer and a client computer which improves the likelihood of a successful download of information.

Referring now to FIG. 1, the present invention is related to improving the likelihood of success of downloads of data from a server computer 10 to a client computer 12 over a network 14. The network 14, for example, may be an ethernet network, an asynchronous transfer mode network or other kind of network. The network protocol, for example, may be the internet protocol (IP). The transport protocol may be, for example, the user datagram protocol (UDP), the transport control protocol (TCP) or other protocol. The use of TCP/IP is described in Internetworking with TCP/IP, Vols. I and II, by D. E. Comer and D. L Stevens, Prentice-Hall, Inc., 1991. TCP/IP is particularly useful because it is both reliable and available for most networking technology.

The server computer 10 has a file transfer server 16 which can be accessed by an executed client program 18 over the network 14. Several client programs 18 are available, such as browsers for the World Wide Web which may download files or read and display HTML documents, such as the Navigator browser from Netscape Communications, Inc., or the Internet Explorer browser, from Microsoft Corporation, or FTP clients such as the "WS_FTP" FTP client available from Ipswitch, Inc. The file transfer server 16 makes various information available, such as data files stored on a storage device 20 which are accessed through the file system of the server computer 10. On the Internet, such file transfer servers include HTTP servers and FTP servers. Such file transfer server, in response to requests from a client computer, open and read a data file and use the TCP/IP protocol to establish a connection with the client, then transfer data from a data file to the client. However, these file transfer servers typically do not ensure that the client reliably receives the requested data and rely on the TCP/IP protocol to provide reliable data transfer.

In one embodiment of the present invention, the file transfer server is a computer program executed on the server computer which uses read and send commands available through the operating system on the server computer to access the file system and the transport protocol of the network. These commands allow an application to read data files from the storage device 20 and send data over the network 14, for example by using TCP as the transport protocol and IP as the network protocol. If the server computer is supported by the UNIX operating system, the "read" and "send" commands available through the UNIX operating system can be used in a computer program, for example, implemented in the "C" programming language.

The executed client program 18 establishes a connection with the file transfer server, e.g., and requests a data file using commands in an application protocol supported by the file transfer server. The executed client program also includes a process for monitoring the download operation as indicated at 22. This process monitors the data as it is received and while it is stored on the storage medium 24. If the download is interrupted for some reason, for example an error occurs in initiating the download operation, the request for data is repeated. In particular, if the underlying transport and network protocols, such as TCP/IP, cause the server computer to terminate the download process, the executed client program can detect this condition, for example by using a time out operation. The download operation can then be restarted by another request. In a particular embodiment of the invention, the server includes a module 26 which is capable of processing requests for reading data from a file starting from a specified offset. In this embodiment, the client keeps track of how much data has been reliably received and requests the server to retrieve the remainder of the data file starting from a specified offset, thus avoiding the need to retransmit the entire data file.

In one embodiment of the invention, the client program is stored at the server. In response to a request to download a file, using a different application protocol between a different file transfer server and a different clients, the client program is downloaded first, with the location of the requested file stored within the program. The client program is then executed on the client computer to transfer the requested file. This embodiment of the invention is particularly useful for downloading files that are made available through other services, such as by a listing in a document published in the hypertext markup language (HTML) via an HTTP server connected to a computer network. A browser that accesses and displays the HTML file can display files available for download as hypertext links. Selection of a hypertext link viewed in the browser may cause the client program to be downloaded, which then downloads the requested file. The client program can be made sufficiently small, specifically as it downloads, so that downloading of the client program takes little time. Alternatively, the client program may be resident at the client computer. The client program can be executed immediately, at a time specified by the user or upon command from the user or an application.

Figure 2:
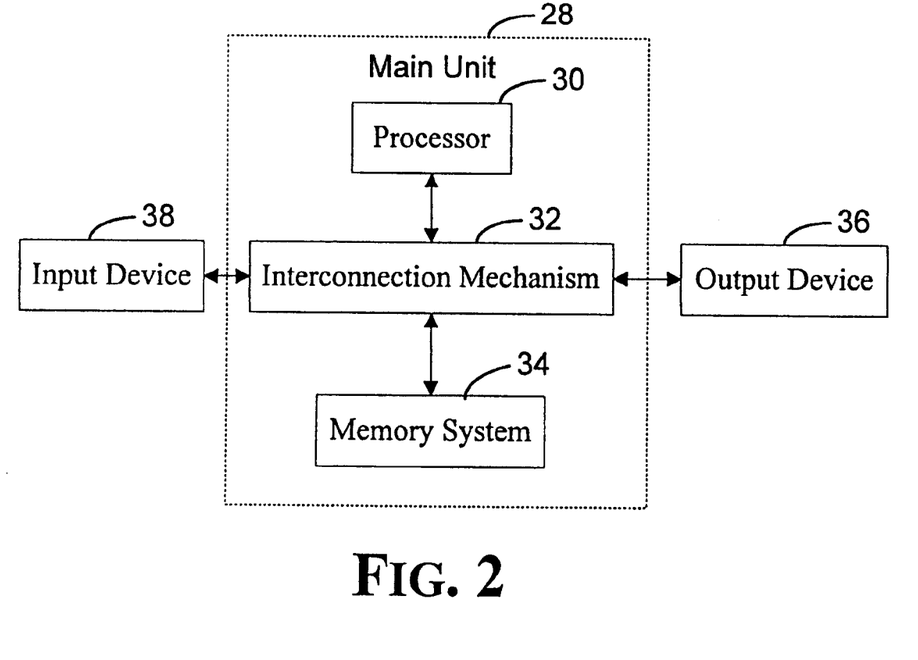
FIG. 2 is a block diagram of a typical general purpose computer system which may be used to implement a client computer or a server computer in FIG. 1.

A suitable computer system to implement either the server computer 10 or client computer 12 is shown in FIG. 2 and typically includes an output device 36 which displays information to a user. The computer system includes a main unit 28 connected to the output device and an input device 38, such as a keyboard or mouse. The main unit generally includes a processor 30 connected to a memory system 34 via an interconnection mechanism 32. The input device 38 is also connected to the processor and memory system via the interconnection mechanism 32, as is the output device 36.

It should be understood that one or more output devices may be connected to the computer system. Example output devices include a cathode ray tube (CRT) display, liquid crystal displays (LCD), printers, communication devices such as a modem, and audio output. It should also be understood that one or more input devices may be connected to the computer system. Example input devices include a keyboard, keypad, track ball, mouse, pen and tablet, communication device, audio input and scanner. It should be understood the invention is not limited to the particular input or output devices used in combination with the computer system or to those described herein.

The computer system 20 may be a general purpose computer system which is programmable using a high level computer programming language, such as "C," "C++" "Pascal," "Visual Basic" or other language. The computer system may also be specially programmed, special purpose hardware. In a general purpose computer system, the processor is typically a commercially available processor, of which the series x86 processors, including a Pentium processor using MMX extensions available from Intel, and the 680X0 series microprocessors available from Motorola are examples. Many other processors are available. Such a microprocessor executes a program called an operating system, of which Windows95, WindowsNT, UNIX, DOS and VMS are examples, which controls the execution of other computer programs and provides scheduling, debugging, input/output control, accounting, compilation, storage assignment in a file system containing named files of data, data management and memory management, communication control, protection and related services. The processor and operating system define a computer platform for which application programs in high-level programming languages are written.

Figure 3:
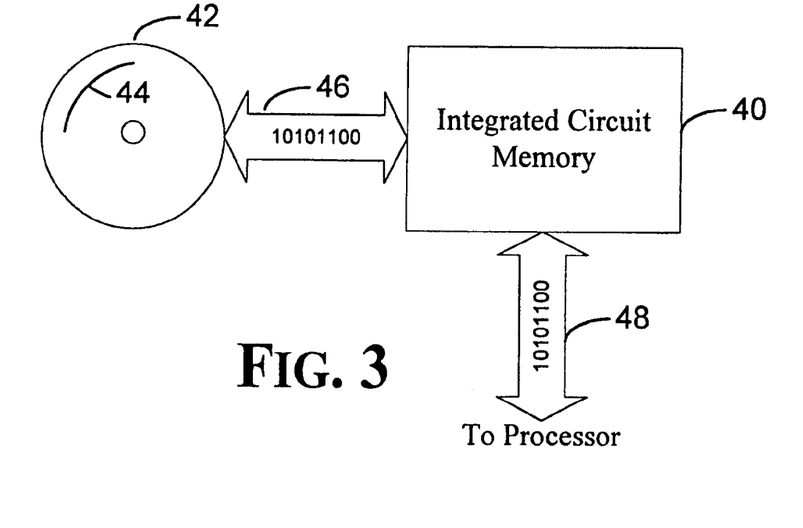
FIG. 3 is an illustration of a typical memory system shown in FIG. 2.

A memory system shown in more detail in FIG. 3, typically includes a computer readable and writeable non-volatile recording medium 42, of which a magnetic disk, a flash memory and tape are examples. The disk may be removable, known as a floppy disk, or permanent, known as a hard drive. A disk has a number of tracks 44 in which signals are stored, typically in binary form, i.e., a form interpreted as a sequence of one and zeros as shown 46 and 48. Such signals may define, for example, an application program to be executed by the microprocessor, or information stored on the disk to be processed by the application program. Typically, in operation, the processor causes data to be read from the nonvolatile recording medium 42 into an integrated circuit memory element 40, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and copies the data to and from the disk if the data is not being used. A variety of mechanisms are known for managing data movement between the disk and the integrated circuit memory element, and the invention is not limited thereto. It should also be understood that the invention is not limited to a particular memory system.

It should be understood the invention is not limited to a particular computer platform, particular processor, or particular high-level programming language. Additionally, the computer system may be a multiprocessor computer system or may include multiple computers connected over a computer network.

In one embodiment of the present invention, the client program may be implemented as a computer program, for example in the "C++" programming language and compiled for execution on the desired platform, such as a machine with a Windows95 operating system. The program also may be implemented, for example, in the Java programming language, where a browser would execute the Java program to download the requested file. In general, this program, when executed, has the capability of transferring files from a server computer over a network using an application protocol to communicate with the file transfer server. This client program may be implemented by using at least the read commands available in FTP. The client program has, in addition, the capability to monitor a download operation while it occurs and to automatically restart or continue the download from the point where an interrupt occurs. In one embodiment, a user may specify a time at which the program will be executed to initiate the download. A user may also specify alternative parameters for a download, such as a connection location or another copy of the file to be downloaded.

On the server computer, the file transfer server also may be implemented as a computer program, for example, in the "C" programming language, and compiled for execution on the desired platform, such a machine with a UNIX or WindowsNT operating system. In general, this program, when executed, has the capability of handling client requests to transfer files over a network. Using the same application protocol defined with the client program. For example, the file transfer server may be implemented as an FTP server. In addition, the file transfer server has the capability of opening, reading and transmitting data starting from a specified offset in a data file, where the offset is parameter received from a client, typically as a part of a request from the client to read a particular data file.

Figure 4:
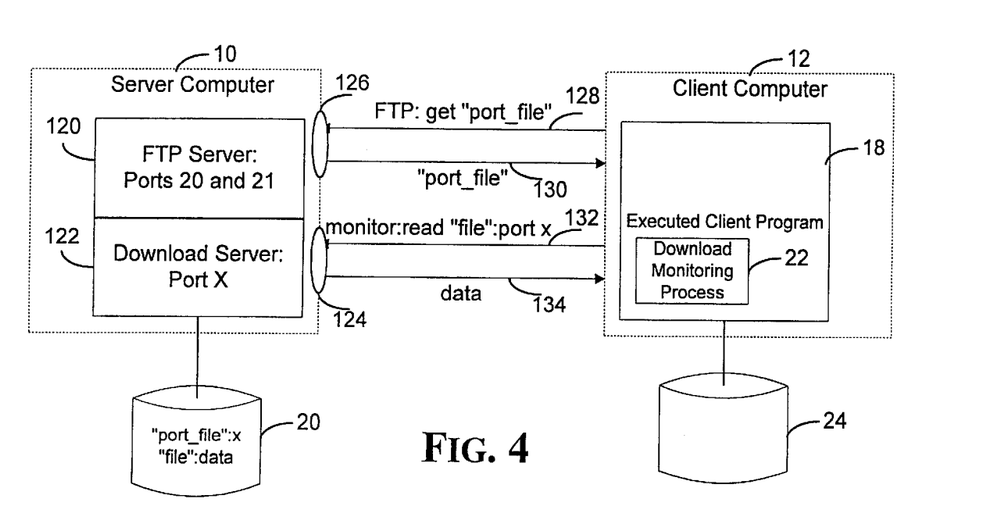
FIG. 4 is a block diagram of one embodiment of the present invention wherein a server sends a client the client program.

One embodiment of the invention will now be described in connection with FIG. 4. In this embodiment, the file transfer server is referred to as a download server 122 which is separate from a standard FTP server 120 operating on the same machine. Because the download server would not be assigned a well-known port according to Internet standards, a client program would need to locate the download server.

The server computer includes the FTP server 120 that communicates using ports 126, which are port numbers 20 and 21 according to convention for the Internet. The download server 122 also is provided on a port 124 which could be any of a number of ports available on the server computer. It is possible that this port could vary from one server computer to another server computer. Accordingly, the indication of the port number "x" is stored in a file at the time the download server is instantiated or executed on the machine, after it has been assigned a port number. This file is preferably stored in the same location with respect to an FTP server on the same machine, and thus will have a predetermined name and path, e.g., "download/port_file." The absence of this file should indicate that the download server is unavailable.

When the client computer executes the client program, the executed client program 18 communicates with the FTP server 120 to retrieve the port file as indicated at 128. This port file is returned in step 142 to the client as indicated in 130. The client reads the port file to obtain the port number for the download server 122. The client can then communicate with the download server via messages sent to port "x."

Figure 5:
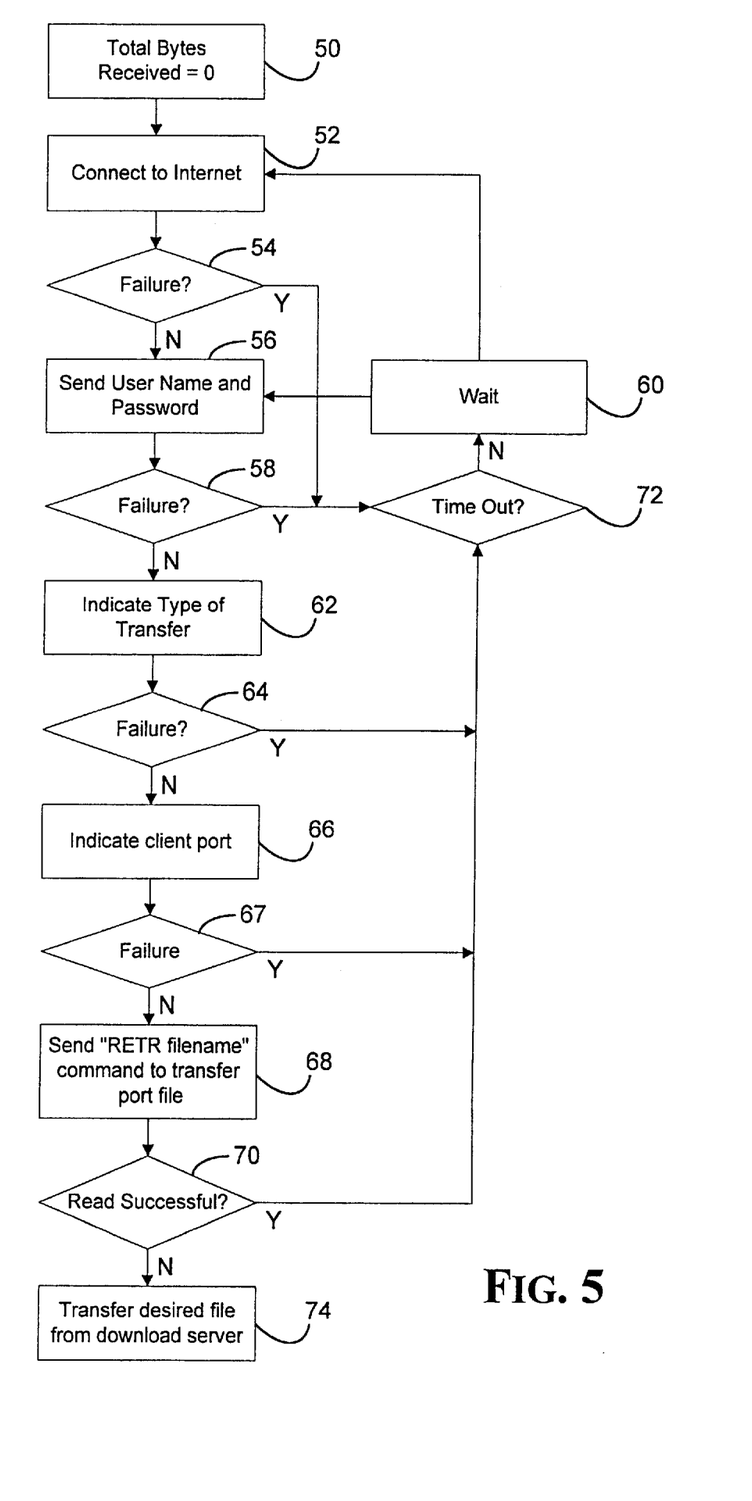
FIG. 5 is a flow chart illustrating how the client computer monitors a download in one embodiment of the invention.

One embodiment of the process performed by the execute client program 18, and particularly module 22, for initiating and monitoring a download will now be described in more detail connection with FIGS. 5 and 6. This process may begin when the client program is executed or at a specified time. For example, if the client program is downloaded with Internet Explorer browser, this browser requests input from the user to indicate whether the file should be opened (executed) or saved. If the file is saved, it can be executed at a later time.

When executed, the client program may request a user to specify a time for the download to occur, using any appropriate user interface, or a time may be automatically specified. When the download begins, a variable value, indicative of the total bytes received, is initialized to zero in step 50. This number will be used to determine how much of a data file has been received, in case a failure occurs during the download process. Next, if necessary, the client connects to the Internet in step 52. The connection may be initiated by an automatic dial-up connection to an Internet service provider and/or by assignment of an IP address to the client, if necessary, or by any other means. A test for an existing connection also can be made. If a failure occurs, as tested for in step 54, a connection attempt in step 52 may be performed again. An alternate connection also may be attempted. Otherwise, the client initiates an FTP transfer to retrieve the file indicating the port number of the download server by sending a message to the FTP server including a user name and password, if necessary, in step 56. This message establishes a connection between the FTP server and the executed client program. User names and passwords commonly are used when the FTP protocol is used to download files. If a failure occurs, as determined in step 58, the process may be restarted, for example by returning to step 56 or step 52, depending on the type of error. It is possible to implement the system so that it waits, in step 60, in order to allow time before resending a message, for example to allow time for a system failure to be remedied.

If the user name and password are successfully sent in step 56, the type of transfer to be performed is then sent to the FTP server in step 62. This is another form of FTP message. If this step is successfully completed, the client's port is then sent to the server in step 66, to inform the FTP server which port on the client machine will receive the data. If this command is completed successfully, a command to retrieve the file containing the port number of the download server is sent to the FTP server in step 68. The client program may specify the file, for example, by using a uniform resource locator (URL). A URL is defined by an Internet Request For Comments (RFC) document. It includes an indicator of a protocol (e.g., ftp or http or other protocol), a site (e.g., ethos.com), and a path (e.g., "a/b/c/filename.txt") for a specific file. It also may include a delimiter, e.g., "?," after which parameters may be added. A URL thus may look like the following:

ftp://ethos.com/a/b/c/filename.txt?parameter.

If either step 62 or 66 fails, as determined in step 64 and 67, respectively, the process can be restarted, possibly including the wait step 60, and returning to either step 52 or 56 depending on the type of error. After the client sends the retrieve file command, the FTP server transmits the port file to the specified port at the client. The client then reads and stores the data. If this read is not successful, retries are performed. It should also be indicated that, as illustrated at 72, that the number of retries may be limited by number or by time. If the read operations are reliably completed, the client then in step 74 proceeds to transfer the desired file from the download server by sending read requests to the port designated in the port file, as described in more detail below in connection with FIG. 6.

Figure 6:
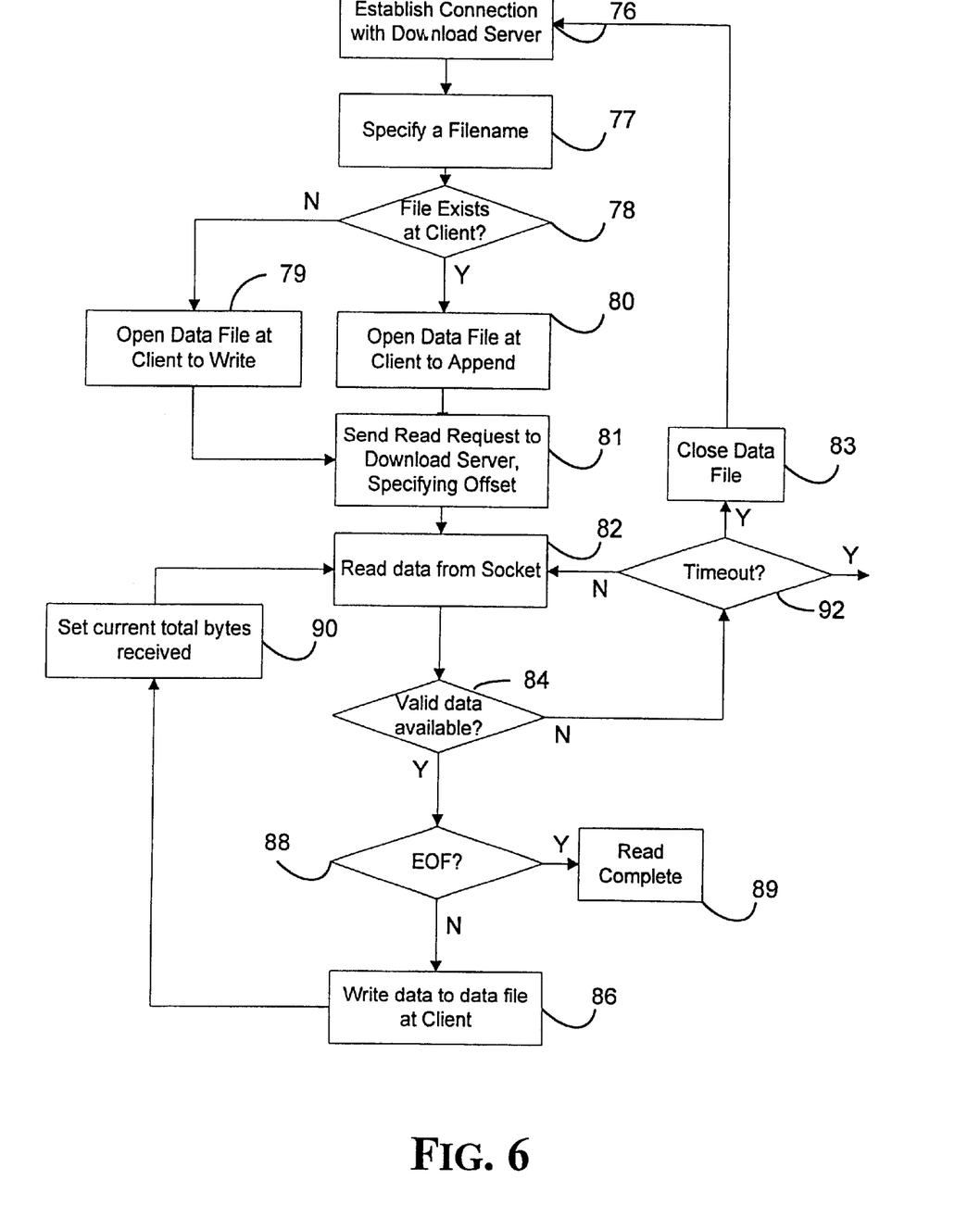
FIG. 6 is a flow chart illustrating how the client computer determines whether a download operation is incomplete in one embodiment of the invention.

Referring now to FIG. 6, one embodiment of the process of transferring data to the client from the download server will now be described. First, the client establishes in step 76 a connection with the download server in a manner similar to how a connection is established with the FTP server. If an error occurs, the error can be reported to the user or an alternate connection may be tried. A filename for a data file for receiving the downloaded file is specified in step 77. This may be done through any appropriate user interface. If the file does not exist, as determined in step 78, it is created an opened in write mode in step 79, otherwise it is opened in append mode in step 80. The client then sends a read request to the download server, and a specified offset, in step 81. Processing by the download server to send the data is described in more detail below in connection with FIG. 7.

Data received at the client is read from a socket (a construct in the TCP/IP protocol) at the indicated port in step 82, for example, using the "recv( )" command. If the data read from the socket indicates that valid data is not available, as determined in step 84, e.g., by returning "−1," the socket is continually read by returning to step 82, subject to a time out operation as determined in step 92. If a time out occurs, the file on the client is closed, and the process of downloading automatically restarts with step 76, of reestablishing the connection with the download server. The automatic restarts from step 76 also may be limited, in number or in time, allowing automatic restart, for example, from step 52 or 56 of FIG. 5. If valid data is read in step 84, then an end of file condition is checked in step 88. For example, the "recv( )" command may return "0." If an end of file is reached, the read operation is complete and the client's data file may be closed. Otherwise, the data read from the socket is written to the data file at the client in step 86. The current total number of bytes reliably received is updated in step 90 and more data is read from the socket in step 82.

Figure 7:
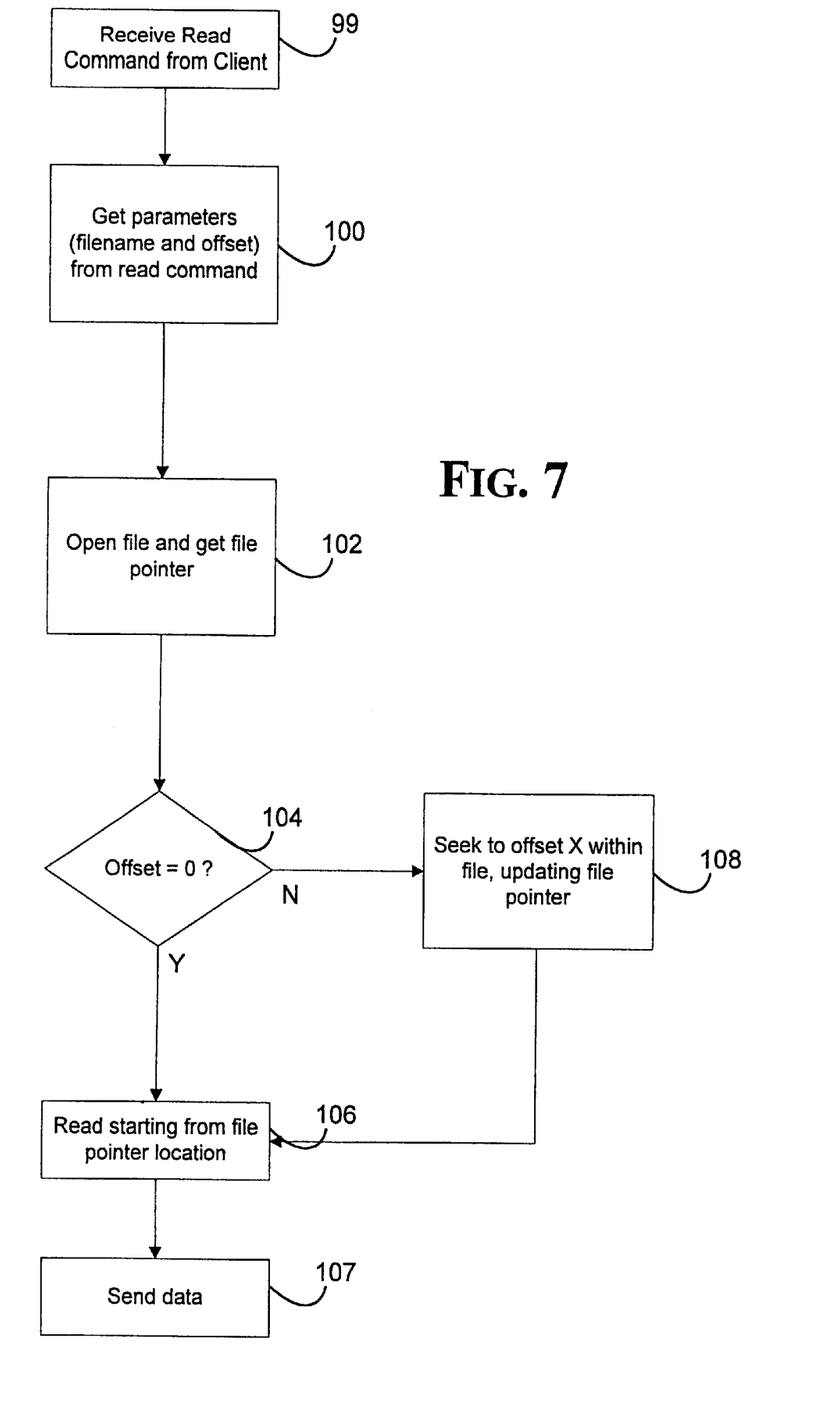
FIG. 7 is a flow chart illustrating how the server computer processes of a request for a portion of a data file in one embodiment of the invention.

Having now described an embodiment of the client program, an embodiment of the download server program in accordance with the invention will now be described with reference to FIG. 7. FIG. 7 describes, in particular, how the download server processes a request for a portion of a file. The download server receives a command in step 99 from the client requesting a data file. It obtains the parameters of this command in step 100. The parameters in this instance include a file name and offset. The file is then opened to receive a file pointer in step. 102. This operation can be performed, for example, using the "fopen" command in the "C" computer programming language.

If the offset is equal to zero, determined in step 104, then data is read starting from the indicated file pointer in step 106 and transmitted to the client using the TCP/IP protocol over the network. If the offset is not equal to zero, the file pointer is updated to the specified offset. Then the data is read from the data file in step 106 starting from the updated pointer location. The pointer location may be updated, for example by using the "fseek" command in the "C" programming language. The data read is then sent to the client in step 107.

Using a client and server as described above, several benefits are provided. For example, a user may download information at a site at a specified time, typically when the network has less traffic, which should increase the speed of transfer and reduce the likelihood of errors. By automatically initiating the connection and download at a specified time, a user also does not need to be present at the computer to start the download. By using a client that monitors a download and automatically restarting the download from the offset at which a failure occurs, the user does not need to be present to make sure a download is successful. By using a server which starts reading and sending data from a data file from a specified offset within the data file, an interrupted download may be restarted where it left off. The combination of this client and server system increase the likelihood of success of the download, eliminate unnecessary data transfer, while eliminating the need for interaction with an individual.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art. For example, other network protocols and other file transfer protocols operating over such networks may be used. The system also may allow retries using various alternatives to download the data. These and other modifications are contemplated as falling within the scope of the invention as defined by the appended claims and equivalent thereto.

What is claimed is:

1. A process for downloading a data file, said data file defining a start of file and an end of file, from a server computer to a client computer, wherein the data file is stored on a computer readable medium connected to the server computer, wherein the process has an application protocol for sending data as a stream of data using a transport protocol over a computer network connecting the client computer to the server computer, comprising the steps, performed by the client computer, of:

initiating a download of the data file as a stream of data by sending, using the application protocol, a request for the data file to the server computer over the computer network;

monitoring data successfully received by the client computer from the server computer, in response to the request;

storing said data successfully received by the client computer; detecting a termination of the stream of data being downloaded, where the termination may occur anywhere within said stream of data; and in response to the termination of the download of the data file, automatically restarting the download of the data file by initiating a second download of the data file by sending, using the application protocol, a second request for the data file to the server computer, wherein said download starts at any point within the data file, exclusive of the start of file and end of file, and regardless of the presence of markers, frame boundaries, and other boundaries that may occur within said data.

2. A process for downloading a first file from a server computer to a client computer over a network connecting the client computer to the server computer, comprising the steps of:

sending a request for said first file to the server computer over the network;

receiving from the server computer, in response to the request for said first file, a client program which when executed by said client computer, performs the step of:
initiating a download of said first file by sending a request for said first file to the server computer over the computer network.

3. The process as defined in claim 2 further comprising the steps of: detecting a termination of the download, and automatically restarting the download of the data file by initiating another request of the data file, using an application protocol, to the server computer.

4. The process of claim 2 wherein the client program is automatically executed upon its delivery to the client machine.

5. The process of claim 2 wherein the client program is executed by selection of a hypertext link by an HTML browser.

* * * * *